(12) United States Patent
Kitaji et al.

(10) Patent No.: US 9,929,614 B2
(45) Date of Patent: Mar. 27, 2018

(54) MOTOR WITH INTEGRATED SLOT LINER AND BOBBIN WITH GUIDES FOR CONDUCTOR COILS

(71) Applicant: Nidec Corporation, Kyoto (JP)

(72) Inventors: Kazuya Kitaji, Kyoto (JP); Keizo Furukawa, Kyoto (JP); Tomoya Uchimura, Kyoto (JP); Yusuke Watanabe, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 365 days.

(21) Appl. No.: 14/299,112

(22) Filed: Jun. 9, 2014

(65) Prior Publication Data
US 2015/0008783 A1 Jan. 8, 2015

(30) Foreign Application Priority Data

| Jul. 2, 2013 | (JP) | 2013-139027 |
| Jul. 2, 2013 | (JP) | 2013-139028 |
| Jan. 14, 2014 | (JP) | 2014-004545 |

(51) Int. Cl.
*H02K 3/48* (2006.01)
*H02K 3/34* (2006.01)
(Continued)

(52) U.S. Cl.
CPC ............ *H02K 3/345* (2013.01); *H02K 3/34* (2013.01); *H02K 3/48* (2013.01); *H02K 3/487* (2013.01);
(Continued)

(58) Field of Classification Search
CPC .......... H02K 3/487; H02K 3/34; H02K 3/345; H02K 3/48; H02K 3/38; H02K 3/32;
(Continued)

(56) References Cited

U.S. PATENT DOCUMENTS

| 6,573,631 B2 * | 6/2003 | Asao | F16C 19/08 |
| | | | 310/214 |
| 7,965,012 B2 | 6/2011 | Murakami et al. | |

(Continued)

FOREIGN PATENT DOCUMENTS

| EP | 2209181 A2 * | 7/2010 | ............. H02K 3/522 |
| JP | 06-077465 U | 10/1994 | |

(Continued)

OTHER PUBLICATIONS

Furukawa et. al.; "MOTOR"; U.S. Appl. No. 14/318,907, filed Jun. 30, 2014.

(Continued)

*Primary Examiner* — Bernard Rojas
*Assistant Examiner* — Alexander Singh
(74) *Attorney, Agent, or Firm* — Keating & Bennett, LLP

(57) ABSTRACT

A motor includes a shaft, a rotor magnet, an armature, an upper bracket, a lower bracket, and a fixing member. An insulator includes magnetic pole tooth insulating portions, each of which covers a separate one of magnetic pole teeth, and a core back insulating portion configured to cover at least portions of upper and lower end surfaces of a core back. A stator core includes a fixing member arranging portion. The core back insulating portion includes a core back insulating projecting portion configured to project in an axial direction away from a surface covering the core back, and including a radially inner surface located radially inward of a radially inner end of the fixing member arranging portion. The core back insulating projecting portion includes a cut portion at a position radially opposed to the fixing member.

16 Claims, 12 Drawing Sheets

(51) Int. Cl.

| | | |
|---|---|---|
| *H02K 5/15* | (2006.01) | |
| *H02K 3/487* | (2006.01) | |
| *H02K 5/16* | (2006.01) | |
| *H02K 3/52* | (2006.01) | |
| *H02K 5/08* | (2006.01) | |
| *H02K 5/173* | (2006.01) | |

(52) U.S. Cl.
CPC ............. *H02K 3/522* (2013.01); *H02K 5/08* (2013.01); *H02K 5/15* (2013.01); *H02K 5/161* (2013.01); *H02K 5/1732* (2013.01); *H02K 5/1735* (2013.01)

(58) Field of Classification Search
CPC ........... H02K 3/522; H02K 3/46; H02K 5/15; H02K 5/1732; H02K 5/1735; H02K 5/08; H02K 5/161
USPC ... 310/215, 214, 216.114, 216.115, 216.082, 310/194, 260

See application file for complete search history.

(56) References Cited

U.S. PATENT DOCUMENTS

| | | | |
|---|---|---|---|
| 8,400,041 | B2 | 3/2013 | Modi et al. |
| 8,736,130 | B2 | 5/2014 | Modi et al. |
| 2009/0224626 | A1 | 9/2009 | Eppler et al. |
| 2011/0291519 | A1* | 12/2011 | Modi ................... H02K 3/522 310/215 |

FOREIGN PATENT DOCUMENTS

| | | |
|---|---|---|
| JP | 11-220860 A | 8/1999 |
| JP | 11-355996 A | 12/1999 |
| JP | 2001-136699 A | 5/2001 |
| JP | 2003-274579 A | 9/2003 |
| JP | 2007-135357 A | 5/2007 |
| JP | 2007-143295 A | 6/2007 |
| JP | 2007-166851 A | 6/2007 |
| JP | 2008-178204 A | 7/2008 |
| JP | 2009-296809 A | 12/2009 |
| WO | 2011/108735 A1 | 9/2011 |
| WO | 2011/108736 A1 | 9/2011 |

OTHER PUBLICATIONS

Kitaji et. al.; "MOTOR"; U.S. Appl. No. 14/318,915, filed Jun. 30, 2014.

* cited by examiner

MOTOR WITH INTEGRATED SLOT LINER AND BOBBIN WITH GUIDES FOR CONDUCTOR COILS

BACKGROUND OF THE INVENTION

1. Field of the Invention

The present invention relates to an inner-rotor motor.

2. Description of the Related Art

Inner-rotor motors having a large axial dimension and including bearings arranged on both upper and lower sides of an armature have been widely used.

The motors of this type need to have brackets to support the bearings fitted on both upper and lower sides of the armature.

In a motor described in JP-A 11-220860, a fixing screw 7 is passed through a ring-shaped stator 1 in an axial direction, and this fixing screw 7 is used to fasten cover members 5 and 6 to the ring-shaped stator 1.

Meanwhile, in a motor described in JP-A 2001-136699, a metallic part having a high thermal conductivity, such as a screw 9, a rivet 10, a burr 11, is passed through a hole 8 to attach a stator core 13 to a base 16. At this time, a raised portion 17 or an insulator 14, which is made of an insulating material, is arranged between the metallic part and a conducting wire 5 to prevent a contact between the metallic part and the conducting wire 5.

In the case where a screw hole passing through the stator is defined in the stator as in the motor described in JP-A 11-220860, the screw hole may be defined at an outer end of a tooth as in the motor described in JP-A 2001-136699. In this case, the raised portion of the insulator is arranged between a winding and the screw to provide isolation therebetween.

However, in the case where the winding and the screw hole are radially close to each other, the raised portion of the insulator has only a small radial thickness. The small thickness of the raised portion of the insulator results in a decrease in the strength of the raised portion, and the raised portion may be bent radially outward if the winding contacts the raised portion when the winding is formed. If the raised portion is bent radially outward, the raised portion may prevent insertion of a fixing member, such as the screw. Moreover, when the fixing member is inserted through the screw hole, the fixing member may be brought into contact with the raised portion of the insulator to cause damage to the raised portion of the insulator.

SUMMARY OF THE INVENTION

A motor according to a preferred embodiment of the present invention includes a bearing portion including an upper bearing and a lower bearing; a shaft, including a central axis extending in a vertical direction as a center thereof, rotatably supported by the bearing portion; a rotor magnet configured to rotate together with the shaft; an armature arranged radially outside the rotor magnet; an upper bracket arranged axially above the armature, and configured to hold the upper bearing at a radial center thereof, the upper bearing being configured to rotatably support the shaft; a lower bracket arranged axially below the armature, and configured to hold the lower bearing at a radial center thereof, the lower bearing being configured to rotatably support the shaft; and a fixing member configured to extend in the vertical direction, and configured to fix the armature to each of the upper and lower brackets. The armature includes a stator core including an annular core back and a plurality of magnetic pole teeth configured to project radially inward from the core back; an insulator configured to cover at least an upper surface and a lower surface of each of the plurality of magnetic pole teeth of the stator core; and coils each of which is defined by a conducting wire wound around a separate one of the plurality of magnetic pole teeth with the insulator intervening therebetween. The insulator includes magnetic pole tooth insulating portions each of which is configured to cover a separate one of the plurality of magnetic pole teeth; and a core back insulating portion integrally provided together with each of the magnetic pole tooth insulating portions as a single monolithic member and configured to cover at least portions of upper and lower end surfaces of the core back. The stator core further includes a fixing member arranging portion configured to have the fixing member inserted therethrough in an axial direction, arranged radially outside one of the plurality of magnetic pole teeth, and defined by a through hole or a cut recessed radially inward from a radially outer circumference of the stator core. The core back insulating portion includes a core back insulating projecting portion configured to project in the axial direction away from a surface covering the core back, and including a radially inner surface arranged radially inward of a radially inner end of the fixing member arranging portion. The core back insulating projecting portion includes a cut portion at a position radially opposed to the fixing member.

A motor according to another preferred embodiment of the present invention includes a bearing portion including an upper bearing and a lower bearing; a shaft, including a central axis extending in a vertical direction as a center thereof, rotatably supported by the bearing portion; a rotor magnet configured to rotate together with the shaft; an armature arranged radially outside the rotor magnet; an upper bracket arranged axially above the armature, and configured to hold the upper bearing at a radial center thereof, the upper bearing being configured to rotatably support the shaft; and a lower bracket arranged axially below the armature, and configured to hold the lower bearing at a radial center thereof, the lower bearing being configured to rotatably support the shaft. The armature includes a stator core including an annular core back and a plurality of magnetic pole teeth configured to project radially inward from the core back; an insulator configured to cover at least an upper surface and a lower surface of each of the plurality of magnetic pole teeth of the stator core; and coils each of which is defined by a conducting wire wound around a separate one of the plurality of magnetic pole teeth with the insulator intervening therebetween. The insulator includes magnetic pole tooth insulating portions each of which is configured to cover a separate one of the plurality of magnetic pole teeth; and a core back insulating portion integrally provided with each of the magnetic pole tooth insulating portions as a single monolithic member and configured to cover at least portions of upper and lower end surfaces of the core back. The stator core further includes a fixing member arranging portion arranged radially outside one of the plurality of magnetic pole teeth, and defined by a through hole passing through the stator core in an axial direction or a cut recessed radially inward from a radially outer circumference of the stator core. The core back insulating portion includes a core back insulating projecting portion configured to project in the axial direction away from a surface covering the core back, and including a radially inner surface arranged radially inward of a radially inner end of the fixing member arranging portion. The core back insulating projecting portion includes a cut portion.

Preferred embodiments of the present invention reduce or eliminate the likelihood of contact occurring between a winding and a fixing member in a motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis of a motor extends, and that a side on which a circuit board is arranged with respect to a stator core is defined as an upper side. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a motor according to any of the preferred embodiments of the present invention when in use.

A motor 1 according to the present preferred embodiment of the present invention is preferably, for example, installed in a household electrical appliance, such as, e.g., an air conditioner, an air purifier, or a refrigerator, and is used as a driving source of a fan or a pump. Alternatively, the motor 1 according to the present preferred embodiment may preferably be used as a driving source of industrial equipment, such as, for example, a sorter. Note that motors according to other preferred embodiments of the present invention may be used for any other desirable purposes without any restriction. For example, motors according to other preferred embodiments of the present invention may be installed in an office automation appliance, a medical appliance, an automobile, and the like, and be used to generate a variety of driving forces. Hereinafter, a device in which the motor 1 is installed is referred to as a "drive apparatus".

Figure 1:
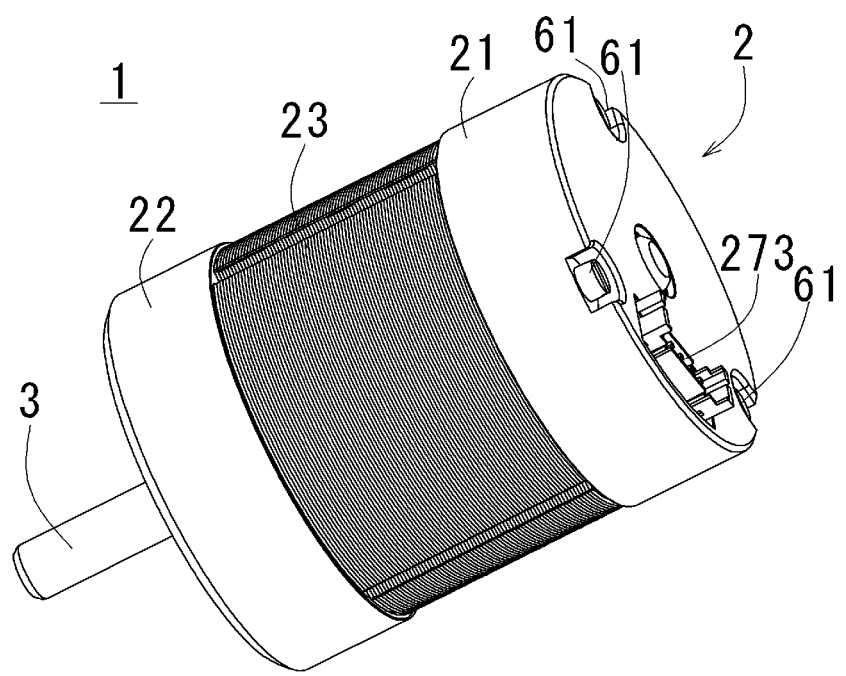
FIG. 1 is a perspective view of an external appearance of a motor according to a preferred embodiment of the present invention.
Figure 2:
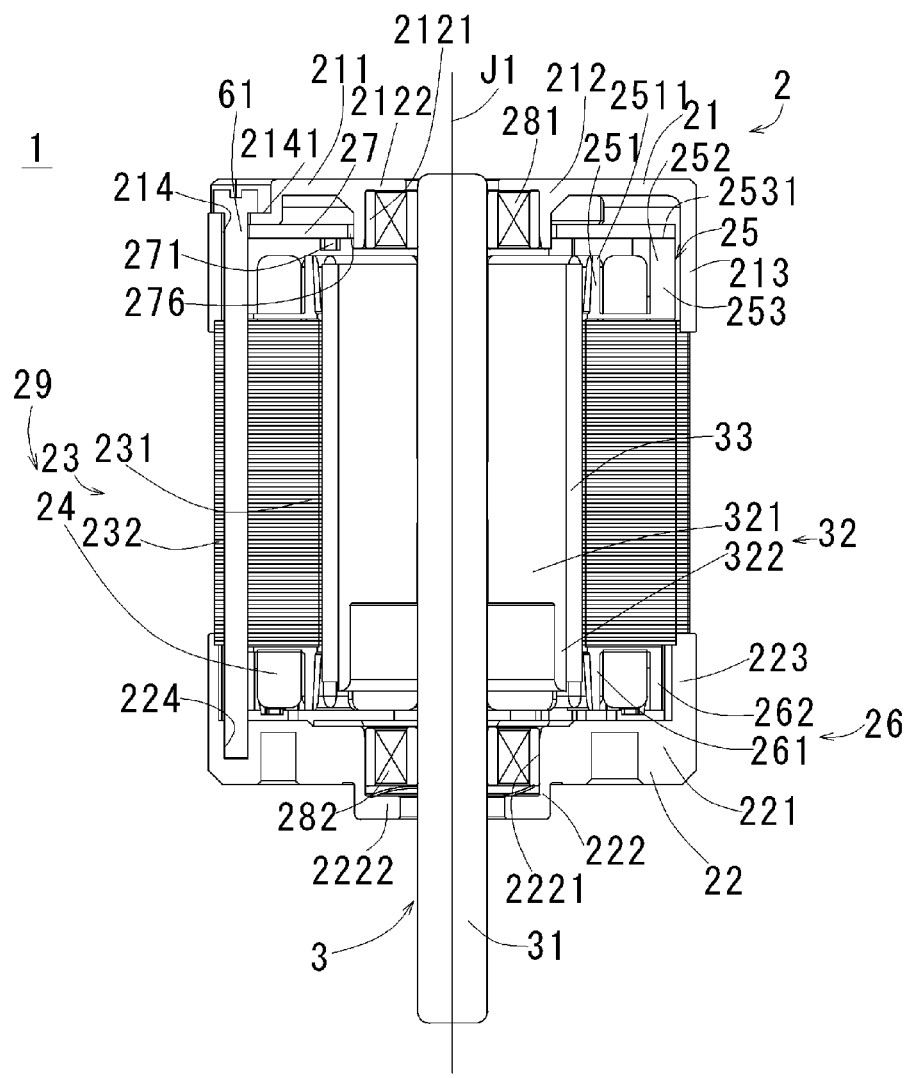
FIG. 2 is a cross-sectional view of the motor.

FIG. 1 is a perspective view of an external appearance of the motor 1 according to the present preferred embodiment. FIG. 2 is a cross-sectional view of the motor 1. Referring to FIGS. 1 and 2, the motor 1 includes a stationary portion 2 and a rotating portion 3. The stationary portion 2 is preferably fixed to a frame of the drive apparatus (not shown). The rotating portion 3 is supported to be rotatable with respect to the stationary portion 2.

The stationary portion 2 according to the present preferred embodiment preferably includes an upper bracket 21, a lower bracket 22, a stator core 23, coils 24, an upper insulator 25, a lower insulator 26, a circuit board 27, and a bearing portion.

The upper bracket 21 is arranged to hold the stator core 23 and the bearing portion (more specifically, an upper bearing 281). The upper bracket 21 is preferably in or substantially in the shape of a covered cylinder. The upper bracket 21 is preferably made of a metal. The upper bracket 21 is preferably obtained by a so-called die-casting process, for example. Specifically, the upper bracket 21 is preferably obtained by melting a metal including zinc as a main component, and pouring the molten metal into a mold used in molding the metal. Note that the upper bracket 21 may not necessarily be produced by the die-casting process, but may be processed by another processing method, such as, for example, press working. Also note that the upper bracket 21 may not necessarily be made of the metal, but may be made of a resin, for example.

The lower bracket 22 is arranged to hold the stator core 23 and the bearing portion (more specifically, a lower bearing 282). The lower bracket 22 has a bottom and is preferably cylindrical or substantially cylindrical in shape. The lower bracket 22 is preferably made of a metal.

The lower bracket 22 is preferably obtained by the so-called die-casting process. Specifically, the lower bracket 22 is obtained by melting a metal including zinc as a main component, and pouring the molten metal into a mold used in molding the metal. Note that the lower bracket 22 may not necessarily be produced by the die-casting process, but may be processed by another processing method, such as press working, for example. Also note that the lower bracket 22 may not necessarily be made of the metal, but may be made of a resin. In the present preferred embodiment, the stator core 23 and the lower bearing 282 are preferably held by the lower bracket 22 that is defined by a single member. This makes it possible to position the stator core 23 and a shaft 31 (described below) relative to each other with high precision.

The stator core 23 and the coils 24 function as an armature of the motor 1. The stator core 23 is preferably defined by, for example, laminated steel sheets, that is, electromagnetic steel sheets, such as silicon steel sheets, placed one upon another in an axial direction. The axial direction is herein assumed to be a direction parallel or substantially parallel to a central axis J1 of the motor 1. The stator core 23 preferably includes an annular core back 231 and a plurality of magnetic pole teeth 232 arranged to project radially inward from the core back 231. The core back 231 is held by the upper and lower brackets 21 and 22 by being held between the upper and lower brackets 21 and 22. An outer circumferential surface of the core back 231, except for an axially upper portion and an axially lower portion thereof, preferably defines a portion of an outer circumferential surface of the motor 1. A portion of each magnetic pole tooth 232 of the stator core 23 around which a corresponding one of the coils 24 is wound is arranged to have a circumferential width equal to or smaller than twice the radial width of the core back 231. In the present preferred embodiment, the number of magnetic pole teeth 232 is preferably six, for example.

Here, an outer circumferential surface of the stator core 23, except for an area near an upper end and a lower end thereof, is preferably not covered with the upper and lower brackets 21 and 22, so that a portion of the outer circumferential surface of the stator core 23 is exposed from the upper and lower brackets 21 and 22. That is, according to the present preferred embodiment, a total area over which the outer circumferential surface of the stator core 23 is radially opposed to the upper bracket 21 or the lower bracket 22 is reduced as compared to the case where the entire outer circumferential surface of the stator core 23 is covered with the upper and lower brackets 21 and 22. Accordingly, even if each of the upper and lower brackets 21 and 22 is a magnetic body, a leakage of magnetic flux from the outer circumferential surface of the stator core 23 to the upper and lower brackets 21 and 22 is less likely to occur. Thus, a reduction in a core loss due to the upper and lower brackets 21 and 22 is achieved, and an improvement in energy efficiency of the motor 1 is achieved.

The stator core 23 preferably includes through holes 233 defined at boundaries between the core back 231 and some of the magnetic pole teeth 232. In the present preferred embodiment, the number of through holes 233 is preferably three, for example. The through holes 233 are preferably arranged at regular intervals in a circumferential direction with the central axis J1 as a center. In the present preferred embodiment, the through holes 233 are preferably arranged at regular intervals of 120 degrees with the central axis J1 as the center. Note that the through holes 233 as described above are not essential to the present invention, but may be replaced with, for example, grooves each of which is recessed radially inward. Fixing members 61 described below are inserted through the through holes 233.

The outer circumferential surface of the stator core 23 includes vertical grooves 234 each of which extends in the axial direction. Projecting portions 216 of the upper bracket 21 and projecting portions 228 of the lower bracket 22 are inserted or fitted into the vertical grooves 234. Thus, each of the upper and lower brackets 21 and 22 is positioned radially and circumferentially.

Each coil 24 is defined by a conducting wire wound around a separate one of the magnetic pole teeth 232. The coil 24 is wound around the magnetic pole tooth 232 with an insulator intervening therebetween. In the present preferred embodiment, the conducting wires are preferably connected in a so-called star configuration. Therefore, four end portions of the conducting wires used for a U phase, a V phase, a W phase, and common, respectively, are drawn out from the coils 24. Each of the drawn-out end portions is preferably soldered, for example, to the circuit board 27. Once drive currents are supplied to the coils 24 through the circuit board 27, radial magnetic flux is generated around each of the magnetic pole teeth 232, each of which is a magnetic core. Then, interaction between the magnetic flux of the magnetic pole teeth 232 and that of a rotor magnet 33 included in the rotating portion 3 produces a circumferential torque, so that the rotating portion 3 is caused to rotate about the central axis J1 with respect to the stationary portion 2.

The insulator preferably includes the upper and lower insulators 25 and 26. Each of the upper and lower insulators 25 and 26 is a member made of a resin and arranged to provide electrical isolation and insulation between the stator core 23 and each coil 24. The upper insulator 25 is arranged above the stator core 23. The lower insulator 26 is arranged below the stator core 23. In other words, the stator core 23 is held between the upper and lower insulators 25 and 26. The upper insulator 25 is arranged to cover an upper surface of each magnetic pole tooth 232. The lower insulator 26 is arranged to cover a lower surface of each magnetic pole tooth 232. Moreover, the upper and lower insulators 25 and 26 are arranged to together cover side surfaces of each magnetic pole tooth 232. The upper and lower insulators 25 and 26 together define the insulator. In the present preferred embodiment, the coils 24 are preferably wound around the respective magnetic pole teeth 232 with the upper and lower insulators 25 and 26 intervening therebetween, so that the insulator is fixed to the stator core 23.

Each of the upper and lower insulators 25 and 26 includes portions arranged to intervene between the magnetic pole teeth 232 and the coils 24 to provide electrical isolation and insulation between the magnetic pole teeth 232 and the coils 24. In addition, the upper insulator 25 preferably includes an annular core back insulating portion 252 arranged to extend continuously in the circumferential direction radially outside the coils 24. The core back insulating portion 252 is arranged radially outside the coils 24. The core back insulating portion 252 is a portion arranged to provide isolation and insulation between each coil 24 and another member if a collapse of the coil 24 should occur. An assembly defined by the stator core 23, the coils 24, the upper insulator 25, and the lower insulator 26 is defined as an armature 29. Each of the upper and lower insulators 25 and 26 will be described in detail below.

Figure 3:
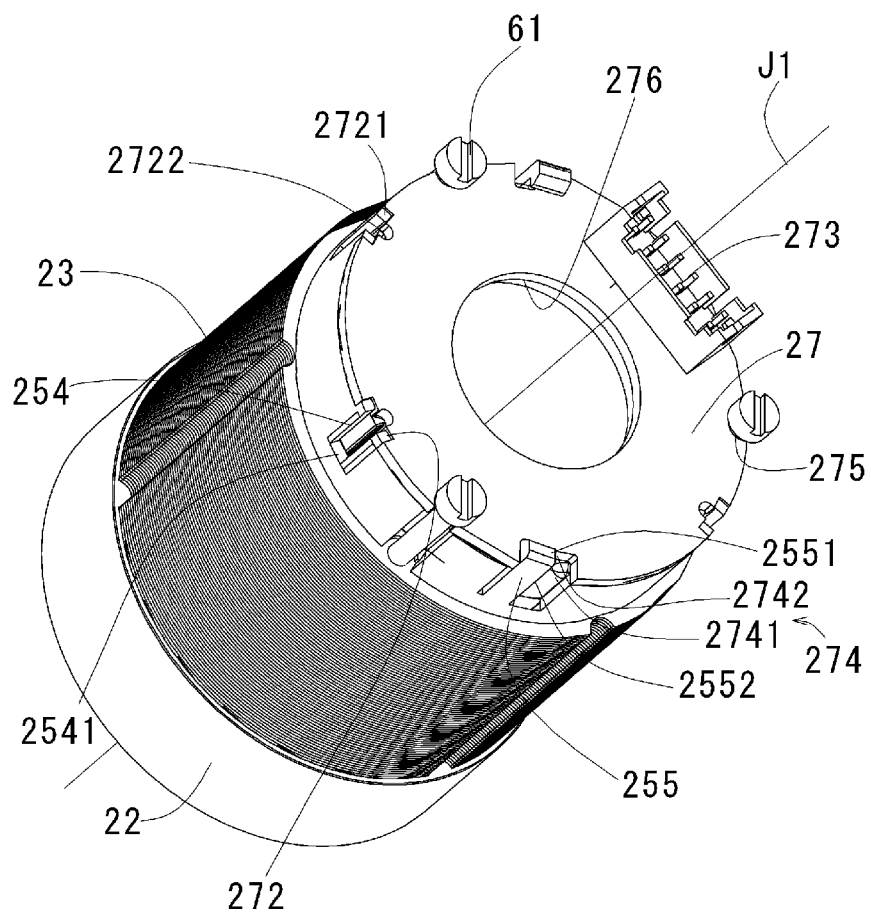
FIG. 3 is a perspective view of the external appearance of the motor with an upper bracket removed from the motor.

FIG. 3 is a plan view of the motor 1 according to the present preferred embodiment with the upper bracket 21 removed from the motor 1. Referring to FIG. 3, the circuit board 27 is preferably a board on which a wiring is arranged to supply the drive currents from an external power supply to the coils 24. The circuit board 27 is preferably in or substantially in the shape of a disk in a plan view. The outside diameter of the circuit board 27 is preferably equal or substantially equal to that of the upper insulator 25, which will be described below. The circuit board 27 is fixed onto a seating surface included in an upper surface of the upper insulator 25. In addition, a magnetic sensor 271 configured to detect a rotation rate of the rotating portion 3 is preferably arranged on a lower surface of the circuit board 27. A Hall element, for example, is preferably used as the magnetic sensor 271.

Referring to FIG. 2, the bearing portion 28 is a member arranged to rotatably support the shaft 31 of the rotating portion 3. The bearing portion is defined by the upper and lower bearings 281 and 282. The upper bearing 281 is held by an inner circumferential surface 2121 of a holding portion 212 of the upper bracket 21. The lower bearing 282 is held by the lower bracket 22. Ball bearings, each of which causes an outer race and an inner race to rotate relative to each other through balls, are preferably used as the bearing portion 28, for example. Note that a bearing of another type, such as a plain bearing, a fluid bearing, or the like, may alternatively be used as the bearing portion 28.

The rotating portion 3 according to the present preferred embodiment includes the shaft 31, a rotor holder 32, and the rotor magnet 33. The shaft 31 is preferably a columnar or substantially columnar member arranged to extend in the vertical direction along the central axis J1. The shaft 31 is preferably arranged to rotate about the central axis J1 while being supported by the above-described bearing portion 28.

A lower end portion of the shaft 31 is arranged to project downward below the lower bracket 22. Meanwhile, an upper end portion of the shaft 31 is arranged to project upward above the circuit board 27. One of the lower end portion and the upper end portion of the shaft 31 is joined to a driving portion of the drive apparatus through a power transmission mechanism, such as a gear. Note that the driving portion of the drive apparatus may be directly driven by the shaft 31.

The rotor holder 32 is a member arranged to rotate together with the shaft 31 radially inside the stator core 23 and the coils 24. The rotor holder 32 according to the present preferred embodiment is preferably made of free-cutting steel. The rotor holder 32 is preferably shaped by cutting, for example. The rotor holder 32 is preferably in or substantially in the shape of the letter "H" in a section, and includes a middle portion 321 and a tubular portion 322. The middle portion 321 is arranged in an axial middle of the rotor holder 32, and the shaft 31 is preferably, for example, press fitted to an inner circumferential surface of the middle portion 321. The tubular portion 322 is preferably a cylindrical or substantially cylindrical portion arranged radially outside the middle portion 321 and arranged to extend axially upwardly and downwardly of the middle portion 321.

Although the rotor holder 32 according to the present preferred embodiment preferably is in or substantially in the shape of the letter "H" in the section, for example, this is not essential to the present invention. The rotor holder 32 may be defined by a plurality of members. For example, the rotor holder 32 may alternatively be produced by press working, for example, so as to have a bottom and be cylindrical in shape. Also, the rotor holder 32 may be defined by laminated magnetic steel sheets, for example. Also, the rotor holder 32 may be produced by sintering, for example. Also, the rotor holder 32 may be produced by combining a component defined by laminated magnetic steel sheets and a component in or substantially in the shape of a covered cylinder and produced by press working, for example. Also, the rotor holder 32 may be produced by resin molding, for example. A rotor according to the present preferred embodiment is preferably a rotor of a so-called SPM (Surface Permanent Magnet) type, but this is not essential to the present invention. A rotor of a so-called IPM (Interior Permanent Magnet) type may be used instead, if so desired. In the case where the rotor of the IPM type is used, it is preferable that the rotor holder 32 should be defined by laminated magnetic steel sheets.

The rotor magnet 33 is cylindrical in shape, and is fixed to an outer circumferential surface of the rotor holder 32. A radially outer surface of the rotor magnet 33 defines a pole surface arranged radially opposite the stator core 23 and the coils 24. The rotor magnet 33 is polarized such that north pole surfaces and south pole surfaces are arranged alternately in the circumferential direction. Note that, in place of the cylindrical rotor magnet 33, a plurality of magnets may alternatively be arranged such that north poles and south poles alternate with each other in the circumferential direction. Also note that the rotor magnet 33 may be embedded in the rotor holder 32 while the rotor of the IPM type is used as mentioned above.

Figure 4:
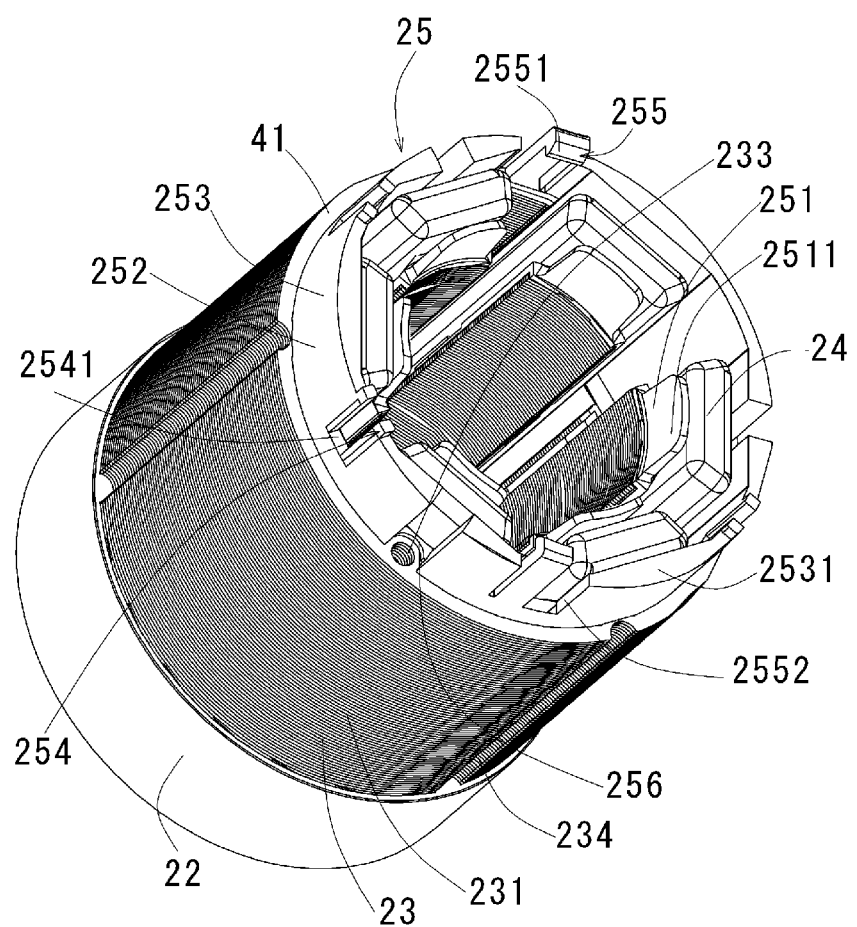
FIG. 4 is a perspective view of the external appearance of the motor with the upper bracket and a circuit board removed from the motor.

FIG. 4 is a perspective view of the external appearance of the motor 1 according to the present preferred embodiment with the upper bracket 21 and the circuit board 27 removed from the motor 1. Referring to FIGS. 3 and 4, the circuit board 27 is preferably in or substantially in the shape of a disk in the plan view. An outer circumferential surface of the circuit board 27 preferably includes cuts, each of which is recessed radially inward from an outer circumference thereof. Each of these cuts is a positioning portion 272. A protruding positioning portion 254 of the upper insulator 25, which will be described below, is preferably inserted into each of the positioning portions 272. Thus, when the circuit board 27 is about to move relative to the upper insulator 25, the protruding positioning portion 254 contacts a corresponding one of the positioning portions 272 to restrain the circuit board 27 from moving. As a result, circumferential and radial positioning of the circuit board 27 with respect to the upper insulator 25 is accomplished with high precision. Each positioning portion 272 includes a decreased width positioning portion 2721 where the cut has a decreased radial width, and an increased width positioning portion 2722 arranged in a circumferential middle of the decreased width positioning portion 2721 and where the cut has a greater radial width than that of the decreased width positioning portion 2721. In more detail, the protruding positioning portion 254 is inserted in the decreased width positioning portion 2721. Note that each positioning portion 272 may be a through hole. An end portion of the conducting wire of at least one of the coils 24 is drawn out above an upper surface of the circuit board 27 through the positioning portion 272, and is, for example, soldered to a land on the upper surface of the circuit board 27.

In addition, a connector 273 is preferably mounted on the upper surface of the circuit board 27. The motor 1 receives the drive currents through the connector 273.

Moreover, the outer circumferential surface of the circuit board 27 preferably further includes cuts each of which is recessed radially inward from the outer circumference thereof. Each of these cuts is preferably a hook insertion portion 274. Each hook insertion portion 274 is a penetration portion. In the present preferred embodiment, a land is arranged in a region adjacent to each hook insertion portion 274 on the upper surface of the circuit board 27. Hook portions 255 of the upper insulator 25, which will be described below, are inserted through the hook insertion portions 274. Each hook insertion portion 274 includes a "decreased width hook insertion portion" 2741 where the cut has a decreased radial width, and an "increased width hook insertion portion" 2742 arranged adjacent to the decreased width hook insertion portion 2741 and having a greater radial width than that of the decreased width hook insertion portion 2741. In more detail, each hook portion 255 is preferably inserted through the decreased width hook insertion portion 2741.

In the present preferred embodiment, the outer circumferential surface of the circuit board 27 further includes cuts each of which is recessed radially inward from the outer circumference thereof. Each of these cuts preferably is a fixing member insertion portion 275. The fixing member insertion portion 275 preferably includes a surface matching the shape of a screw portion of the fixing member (i.e., a screw) 61 described below in a plan view.

A central opening portion 276 passing through the circuit board 27 in the axial direction is preferably defined in a center of the circuit board 27. The shaft 31, the holding portion 212 of the upper bracket 21, which will be described below, and the upper bearing 281 are preferably positioned in the central opening portion 276.

Note that a wiring pattern preferably is arranged so as to be spaced from an edge of the circuit board 27 by a certain distance. It is therefore desirable that the number of holes and cuts defined in the circuit board 27 should be reduced to increase a wiring area on the circuit board 27. In the present preferred embodiment, each of the portions (i.e., the penetration portions), such as, for example, the positioning portions 272 and the hook insertion portions 274, in which protruding portions are inserted is increased in width so that the portion can be used as a cut for the conducting wire to be drawn out. An increase in the wiring area on the circuit board 27 is thus achieved.

The above technique is particularly useful when a large electronic component, such as a control IC, an AC-DC converter, an encoder, a connector, etc., is mounted on the circuit board, when the width of each wire in the wiring pattern is increased to allow a large amount of current to pass on the circuit board, and when there is a need to decrease the area of the circuit board itself.

Figure 5:
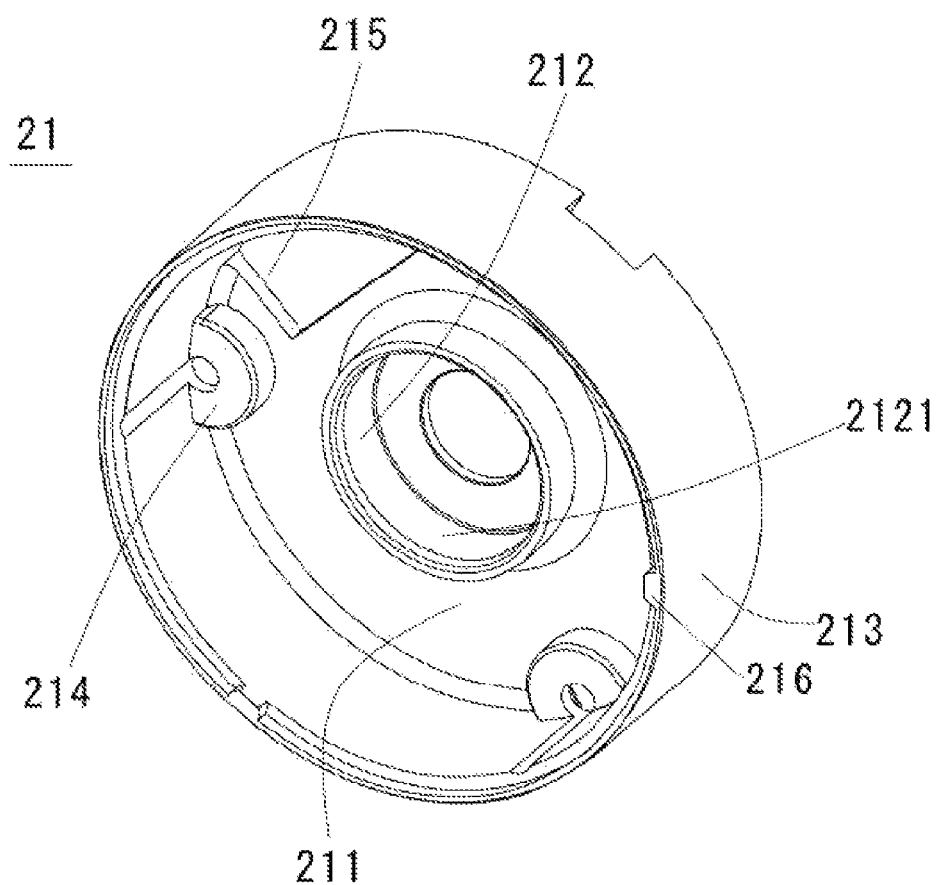
FIG. 5 is a perspective view of the upper bracket according to the above preferred embodiment of the present invention.

First, the upper bracket 21 will be described in detail below. FIG. 5 is a perspective view of the upper bracket 21. Referring to FIGS. 2 to 5, the upper bracket 21 preferably includes a cover portion 211, the holding portion 212, an upper projecting portion 213, a plurality of through holes 214, and an opening 215. The cover portion 211 is preferably in or substantially in the shape of a flat plate, and is arranged axially above the circuit board 27. The holding portion 212 is a recessed portion arranged radially inside the cover portion 211, and opening axially downwardly. The holding portion 212 includes the inner circumferential surface 2121, which is cylindrical, and an annular top surface 2122. The inner circumferential surface 2121 is preferably in contact with an outer circumferential surface of the outer race of the upper bearing 281. The top surface 2122 preferably is in contact with an upper end surface of the outer race of the upper bearing 281. The holding portion 212 is thus arranged to hold the upper bearing 281. An outer circumferential surface of the upper bearing 281 is preferably arranged to have a diameter smaller than that of the central opening portion 276 of the circuit board 27. An axially lower end of the holding portion 212 is arranged at an axial level lower than that of an axially upper end of the circuit board 27. This contributes to reducing the thickness of the motor 1.

The upper projecting portion 213 is arranged to project axially downward from a radially outer end of the cover portion 211. The upper projecting portion 213 is preferably annular or substantially annular. In addition, the upper projecting portion 213 is preferably cylindrical or substantially cylindrical. An inner circumferential surface of the upper projecting portion 213 is preferably in contact with an upper portion of the outer circumferential surface of the stator core 23. This contributes to improving a precision with which the upper bearing 281 is coaxial with the central axis J1, and also contributes to improving the strength of the upper bracket 21. In the present preferred embodiment, the stator core is preferably inserted in the upper projecting portion 213. Note that the stator core 23 may be slightly press fitted to the upper projecting portion 213, if so desired, instead of being simply inserted therein. The inner circumferential surface of the upper projecting portion 213 may be arranged to contact an outer circumferential surface of the circuit board 27 or an outer circumferential surface of the upper insulator 25. An improvement in the strength of the upper bracket 21 is achieved by arranging the inner circumferential surface of the upper projecting portion 213 to contact the circuit board 27 or the upper insulator 25.

The plurality of through holes 214 are preferably arranged in the circumferential direction in a radially outer portion of the cover portion 211. The number of through holes 214 is preferably three in the present preferred embodiment, for example.

In a case where an electronic component which generates a large amount of heat is mounted on the circuit board 27, the cover portion 211 is preferably arranged opposite to this electronic component. This makes it possible to position the electronic component closer to the upper bracket 21. The heat generated by the electronic component is thus dissipated through the upper bracket 21. Note that a heat conducting material, such as, for example, a silicone, may be arranged to intervene between the electronic component and the cover portion 211. This promotes dissipation of the heat from the electronic component. Examples of electronic components which generate a large amount of heat include, for example, a field-effect transistor (FET).

The opening 215 is preferably a through hole defined in the cover portion 211. The connector 273 mounted on the circuit board 27 is preferably exposed through the opening 215. The external power supply is connected to the connector 273 through the opening 215 to supply power to the motor 1.

Referring to FIG. 4, the shape of the upper insulator 25 will now be described in detail below. The upper insulator 25 preferably includes magnetic pole tooth insulating portions 251 and the core back insulating portion 252. Each magnetic pole tooth insulating portion 251 is arranged to cover the upper surface and the side surfaces of a separate one of the magnetic pole teeth 232. The core back insulating portion 252 is preferably annular, and is arranged to join the magnetic pole tooth insulating portions 251 to one another. A plate portion 2511 arranged to project axially upward is preferably arranged at a radially inner end of each magnetic pole tooth insulating portion 251. The core back insulating portion 252 is preferably arranged to extend axially upward radially outside the coils 24. An upper end surface of the core back insulating portion 252 is arranged at an axial level higher than that of an upper end of each coil 24. Each coil 24 is thus preferably prevented from interfering with another member, such as, for example, the circuit board 27, the upper bracket 21, or the like.

The core back insulating portion 252 preferably includes an annular wall portion 253, the protruding positioning portions 254, the hook portions 255, and fixing member insertion recessed portions 256. The annular wall portion 253 is preferably an annular or substantially annular wall arranged to project in the axial direction from a radially outer end of the core back insulating portion 252. An upper surface of the annular wall portion 253 preferably defines a seating surface 2531, and is a flat surface perpendicular or substantially perpendicular to the central axis J1. The seating surface 2531 is arranged to make contact with the lower surface of the circuit board 27. More specifically, the seating surface 2531 is arranged to make contact with a lower surface of an outer edge portion of the circuit board 27. An outer end of the annular wall portion 253 is arranged radially inward of an outer end of the stator core 23. Accordingly, a portion of the stator core 23 which is radially outward of the annular wall portion 253 defines an upper core back exposed portion 41 arranged to be exposed axially upwardly.

Each protruding positioning portion 254 is preferably arranged at or substantially at the same radial position as that of the annular wall portion 253, and is arranged to project axially upward above the seating surface 2531. In addition, each protruding positioning portion 254 is preferably arranged axially below the upper surface of the circuit board 27. Therefore, each protruding positioning portion 254 is accommodated in a corresponding one of the positioning portions 272 of the circuit board 27. This contributes to preventing each protruding positioning portion 254 from making contact with the upper bracket 21 even when a lower surface of the cover portion 211 of the upper bracket 21 is brought into contact with the upper surface of the circuit board 27 as described below. This in turn contributes to securely fixing the circuit board 27.

In the present preferred embodiment, the protruding positioning portions 254 preferably are arranged at three different circumferential positions spaced from each other, for example. Note that, although it is assumed in the present preferred embodiment that the number of protruding positioning portions 254 preferably is three, this is not essential to the present invention. Instead, the number of protruding positioning portions 254 may be any of one, two, or more than three.

The shape of each protruding positioning portion 254 is preferably identical or substantially identical to the shape of each positioning portion 272 in a plan view. That is, each protruding positioning portion 254 is preferably shaped to have a contour extending along a contour of a corresponding one of the positioning portions 272. This enables the circuit board 27 to be positioned with high precision with respect to the upper insulator 25.

More preferably, both circumferential end surfaces of the protruding positioning portion 254 are preferably in contact with circumferential end surfaces of the positioning portion 272. In addition, a radial end surface of the protruding positioning portion 254 is preferably in contact with a radial end surface of the positioning portion 272. This enables the circuit board 27 to be positioned with high precision with respect to the upper insulator 25. Note that the positioning of the circuit board 27 with respect to the upper insulator 25 can be accomplished with high precision even when only one end surface of the protruding positioning portion 254 is preferably in contact with an opposed end surface of the positioning portion 272. Precise positioning of the circuit board 27 with respect to the upper insulator 25 makes it possible to solder the conducting wires to the circuit board 27 in a soldering process described below while preventing each conducting wire from being held between the upper insulator 25 and the circuit board 27.

A first window portion 2541 defined by an axially downward cut is preferably arranged in a circumferential middle of at least one of the protruding positioning portions 254. Note that the first window portion 2541 may be arranged adjacent to the protruding positioning portion 254. A lower end of the first window portion 2541 is arranged at a level lower than that of an upper end of the plate portion 2511 of each magnetic pole tooth insulating portion 251.

Each hook portion 255 is a portion arranged to project in the axial direction from the core back insulating portion 252, and arranged to overlap with the annular wall portion 253 with respect to a radial direction. The hook portion 255 is arranged at a different circumferential position from that of each magnetic pole tooth insulating portion 251. An axially upper end of the hook portion 255 is arranged at an axial level higher than that of the upper surface of the circuit board 27, and the hook portion 255 is arranged to project axially upward above the seating surface 2531 and to a greater extent than each protruding positioning portion 254. The hook portion 255 includes a hook-shaped portion 2551 at a top thereof. The hook-shaped portion 2551 is preferably arranged to project radially inward. A lower surface of the hook-shaped portion 2551 is preferably in contact with the upper surface of the circuit board 27, or is arranged opposite to the upper surface of the circuit board 27 with a gap intervening therebetween.

A second window portion 2552 is preferably arranged circumferentially adjacent to each hook portion 255. Each second window portion 2552 is defined by an axially downward cut defined in the annular wall portion 253. A lower end of the second window portion 2552 is arranged at an axial level lower than that of the upper end of the plate portion 2511 of each magnetic pole tooth insulating portion 251.

Note that each of the protruding positioning portions 254 and the hook portions 255 preferably is a protruding portion.

Note that, in the present preferred embodiment, four of the window portions 2531 and 2552 are preferably arranged at intervals of about 60 degrees, and three of the window portions 2531 and 2552 are arranged at preferably intervals of about 120 degrees, for example (the latter three include two of the four window portions 2531 and 2552 arranged at intervals of about 60 degrees, for example). That is, the total number of window portions 2531 and 2552 is preferably five, for example. This allows the conducting wires to be drawn out in both cases where the conducting wires are connected in the star configuration and where the conducting wires are connected in a delta configuration. Accordingly, the same upper insulator 25 can be used in common even when a method of connecting the conducting wires is changed. Note that a required number of window portions 2531 and 2552 arranged at different circumferential positions preferably is reduced to four, for example, when only the star configuration is adopted to connect the conducting wires.

Each fixing member insertion recessed portion 256 is preferably a recessed portion which is recessed radially inward from an outer edge of the core back insulating portion 252. The screw 61 is inserted through each fixing member insertion recessed portion 256. Note that the fixing member insertion recessed portion 256 may not necessarily be the recessed portion which is recessed radially inward, but may be a through hole passing through the upper insulator 25 in the axial direction.

Figure 6:
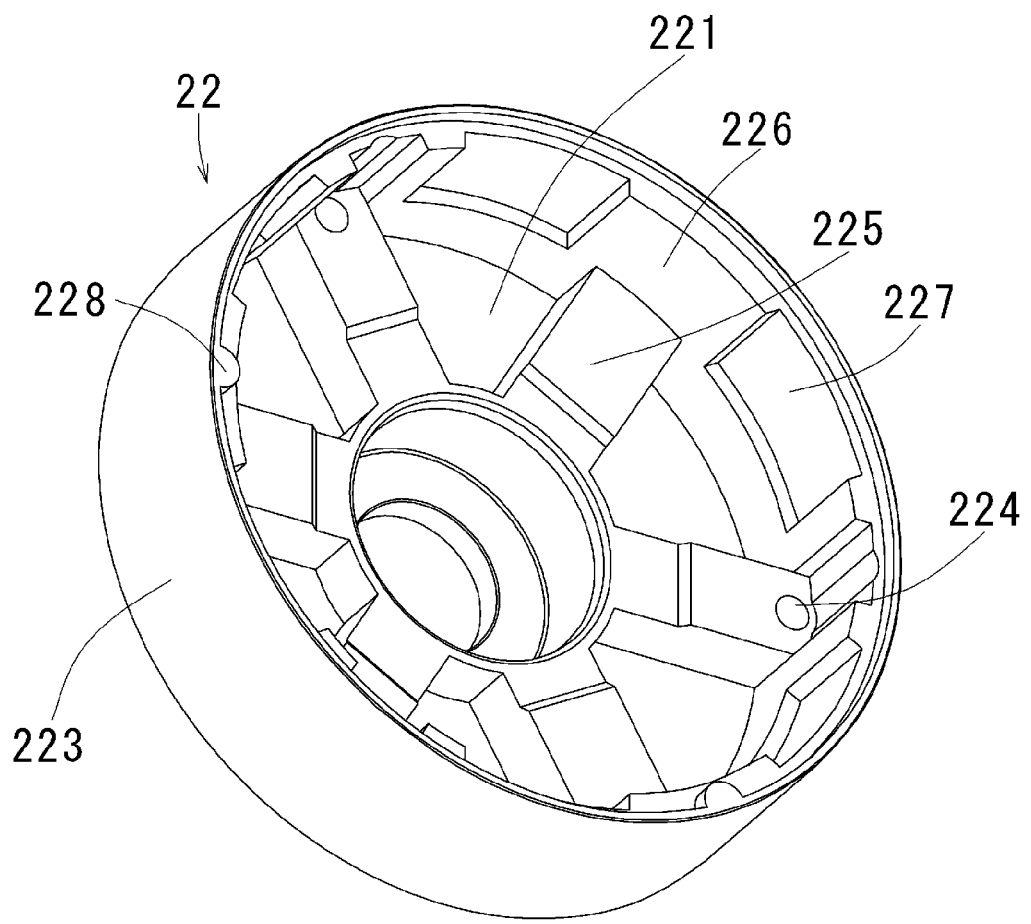
FIG. 6 is a perspective view of a lower bracket according to the above preferred embodiment of the present invention.

First, the lower bracket 22 will now be described in detail below. FIG. 6 is a perspective view of the lower bracket 22. Referring to FIG. 6, the lower bracket 22 preferably includes a lower cover portion 221, a lower holding portion 222, a lower projecting portion 223, a plurality of lower fixing member accommodating portions 224, lower horizontal ribs 225, lower vertical ribs 226, and lower depressed portions 227. The lower bracket 22 is preferably in or substantially in the shape of a covered cylinder. The lower cover portion 221 is preferably in or substantially in the shape of an annular plate. The lower holding portion 222 is preferably a recessed portion arranged radially inside the lower cover portion 221, and opening axially upwardly. The lower holding portion 222 includes a cylindrical inner circumferential surface 2221 and an annular top surface 2222. The inner circumferential surface 2221 is preferably in contact with an outer circumferential surface of the outer race of the lower bearing 282. The top surface 2222 is preferably in indirect contact with a lower end surface of the outer race of the lower bearing 281 with a spring intervening therebetween. The lower holding portion 222 is thus arranged to hold the lower bearing 282.

The lower projecting portion 223 is arranged to project axially upward from a radially outer end of the lower cover portion 221. The lower projecting portion 223 is preferably annular or substantially annular. In addition, the lower projecting portion 223 is preferably cylindrical or substantially cylindrical. An upper end of the lower projecting portion 223 is preferably in contact with the outer circumferential surface of the stator core 23. This contributes to improving a precision with which the lower bearing 282 is coaxial with the central axis J1, and also contributes to securely fixing the lower bracket 22 and the stator core 23 to each other. In the present preferred embodiment, the stator core 23 is preferably inserted in the lower projecting portion 223. Note that the stator core 23 may be slightly press fitted to the lower projecting portion 223, instead of being simply inserted therein, if so desired. An upper surface of the lower projecting portion 223 is preferably in direct contact with the core back 231 of the stator core 23. The lower insulator 26 is not arranged to cover a radially outer region of the core back 231. That is, the core back 231 preferably includes a core back exposed portion 42 arranged radially outward of the lower insulator 26. The upper surface of the lower projecting portion 223 and the core back 231 are preferably in direct contact with each other at the core back exposed portion 42. This contributes to reducing a decrease in precision in axial positioning of the lower bracket 22 with respect to the stator core 23.

The plurality of lower fixing member accommodating portions 224 are arranged in the circumferential direction in a radially outer portion of the lower cover portion 221. In the present preferred embodiment, the number of lower fixing member accommodating portions 224 is preferably three, for example. The circumferential positions of the lower fixing member accommodating portions 224 are arranged to coincide with those of the through holes 214 of the upper bracket 21. The fixing member 61 is inserted into each lower fixing member accommodating portion 224. Note that each lower fixing member accommodating portion 224 according to the present preferred embodiment is preferably a bag-shaped hole (e.g., a blind hole) and not a through hole. However, the lower fixing member accommodating portions 224 could be provided as through holes if so desired.

Each lower horizontal rib 225 is preferably arranged in an upper surface of the lower cover portion 221. In the present preferred embodiment, the number of lower horizontal ribs 225 is preferably six, for example. The lower horizontal ribs 225 are arranged to extend in a radial manner, and are arranged to overlap with the lower fixing member accommodating portions 224 in a plan view. This contributes to preventing a reduction in the strength of the lower bracket 22 despite provision of the lower fixing member accommodating portions 224. The lower horizontal ribs 225, which extend in the radial manner, are preferably joined to each other through a ring-shaped portion at a center of the lower bracket 22. The ring-shaped portion is joined to the lower holding portion 222. This contributes to improving the strength of the lower bracket 22. Moreover, the lower horizontal ribs 225 are preferably arranged to overlap with a plurality of holes defined in a lower surface of the lower cover portion 221 to fix the motor 1 to the drive apparatus in a plan view (not shown). This contributes to preventing a reduction in the strength of the lower bracket 22 despite provision of the holes.

Each lower vertical rib 226 is preferably arranged to extend in the axial direction in an inner surface of the lower projecting portion 223. Each lower vertical rib 226 is preferably defined continuously with a separate one of the lower horizontal ribs 225. This contributes to improving the strength of the lower bracket 22. In the present preferred embodiment, the number of lower vertical ribs 226 is preferably six, for example, which is preferably the same number as that of lower horizontal ribs 225. The lower depressed portions 227, each of which is recessed radially outward, are arranged circumferentially between the lower vertical ribs 226. The lower vertical ribs 226 are circumferentially joined to each other through a ring-shaped portion below the lower depressed portions 227. The ring-shaped portion is joined to the lower cover portion 221.

Figure 7:
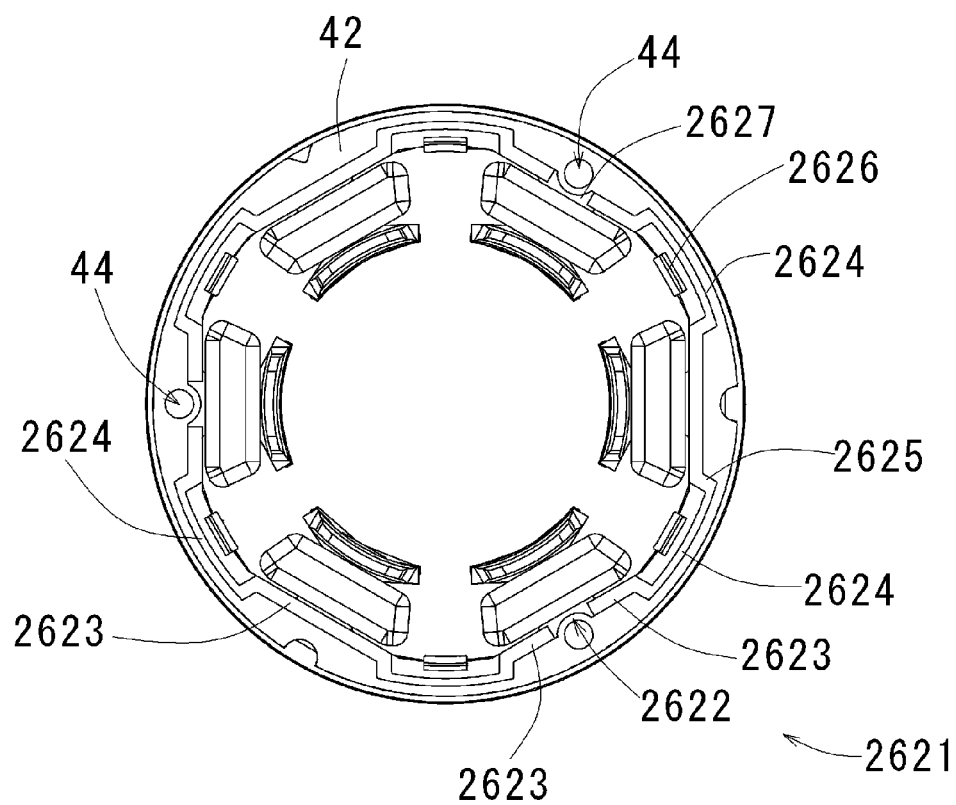
FIG. 7 is a bottom view of an armature according to the above preferred embodiment of the present invention.
Figure 8:
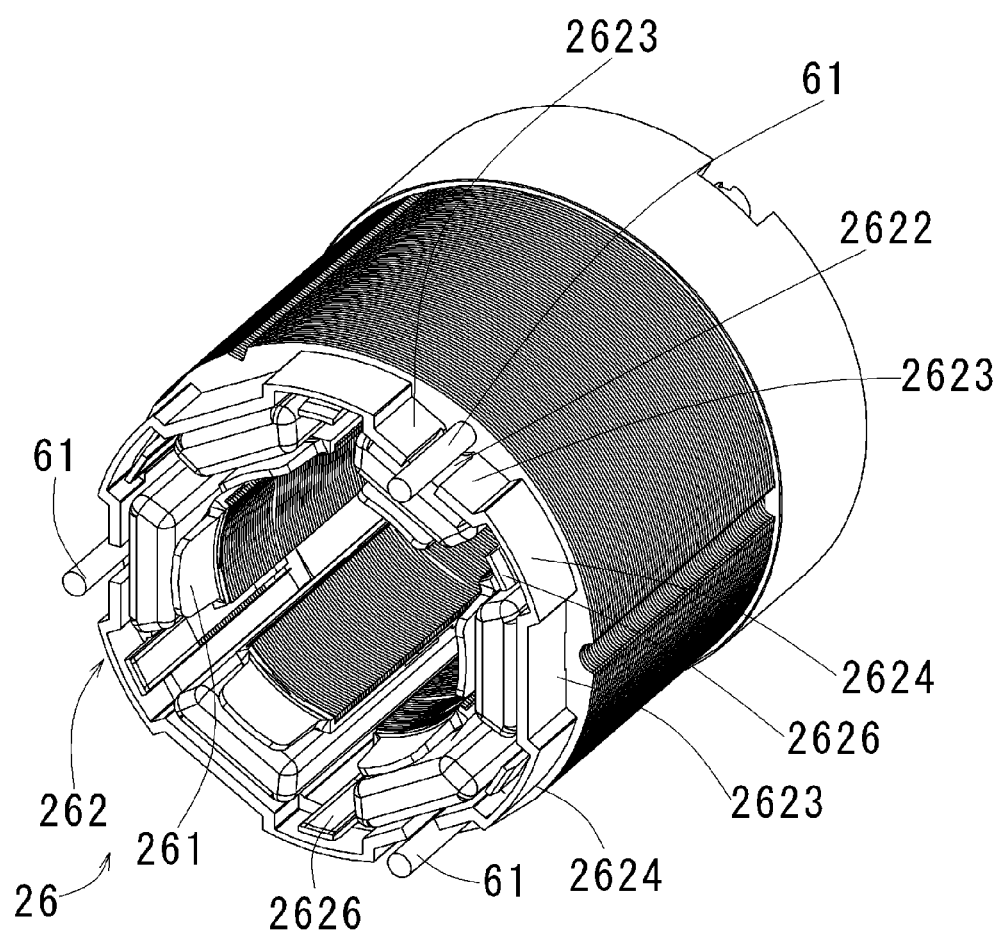
FIG. 8 is a perspective view of the external appearance of the motor with the lower bracket removed from the motor.

FIG. 7 is a plan view of the lower insulator 26 and the stator core 23. FIG. 8 is a perspective view of the external appearance of the motor 1 with the lower bracket 22 removed from the motor 1. Referring to FIGS. 7 and 8, the shape of the lower insulator 26 will now be described in detail below. The lower insulator 26 preferably includes lower magnetic pole tooth insulating portions 261 and a lower core back insulating portion 262. Each lower magnetic pole tooth insulating portion 261 is arranged to cover the lower surface and the side surfaces of a separate one of the magnetic pole teeth 232. The lower core back insulating portion 262 preferably is annular or substantially annular, and is arranged to join the lower magnetic pole tooth insulating portions 261 to one another. An outer circumferential surface of the lower core back insulating portion 262 is preferably arranged at the same or substantially the same radial position as that of an outer circumferential surface of a lower decreased diameter portion 43 of the core back 231. That is, a lower surface of a portion of the core back 231 which has an increased diameter is preferably not covered by the lower core back insulating portion 262 but is exposed. The lower surface of the portion of the core back 231 which has the increased diameter is the core back exposed portion 42 mentioned above. A plate portion 2611 arranged to project in the axial direction is preferably arranged at a radially inner end of each lower magnetic pole tooth insulating portion 261. The plate portion 2611 is a plate-shaped wall arranged to extend in the circumferential direction. The plate portion 2611 is arranged radially opposite an inner end of a corresponding one of the coils 24. The lower core back insulating portion 262 preferably includes a lower core back insulating projecting portion 2621 arranged to project in the axial direction away from a surface covering the core back 231. The lower core back insulating projecting portion 2621 is arranged to serve as a wall extending in the circumferential direction.

The lower core back insulating projecting portion 2621 preferably includes cut portions 2622, coil guide walls 2623, passage line guide walls 2624, joining walls 2625, and passage line holding portions 2626. Each cut portion 2622 refers to a cut defined in the wall of the lower core back insulating projecting portion 2621 extending continuously in the circumferential direction. In the present preferred embodiment, the coil guide walls 2623, the passage line guide walls 2624, and the joining walls 2625 preferably together define the circumferentially continuous wall of the lower core back insulating projecting portion 2621 together with the cut portions 2622. Each cut portion 2622 is defined in the lower core back insulating projecting portion 2621 at a position radially opposed to one of the lower magnetic pole tooth insulating portions 261. A fixing member arranging portion 44 of the stator core 23 and one of the fixing members 61 are arranged radially outside each cut portion 2622. That is, each cut portion 2622 is preferably arranged radially opposite a separate one of the fixing members 61. In other words, the cut portions 2622 are defined in the lower core back insulating projecting portion 2621 at positions radially opposed to the fixing members 61. Two of the coil guide walls 2623 are arranged on both circumferential sides of each cut portion 2622. The cut portion 2622 preferably has a circumferential width smaller than the circumferential width of each magnetic pole tooth 232 around which the conducting wire is wound. In other words, the lower core back insulating projecting portion 2621 preferably is continuous except at the cut portions 2622. Thus, an improvement in rigidity of the lower insulator 26 is achieved.

The coil guide walls 2623 are preferably arranged radially outside the magnetic pole tooth insulating portions 261. Each coil guide wall 2623 is arranged radially inward of each passage line guide wall 2624 described below. A radially inner surface of each coil guide wall 2623 is arranged opposite to a radially outer side of a corresponding one of the coils 24 each of which is defined by the conducting wire wound around a separate one of the magnetic pole teeth 232. Preferably, the radially inner surface of each coil guide wall 2623 is preferably in contact with the radially outer side of the corresponding coil 24. Multiple turns of the conducting wire are wound around each of the magnetic pole teeth 232 to define the coils 24. That is, a collapse of each coil 24 needs to be prevented by using the insulator or another member to prevent the multiple turns of the conducting wire from becoming loose. In particular, in the present preferred embodiment, the fixing member arranging portions 44 and the fixing members 61 are arranged radially outside the coils 24. If a collapse of any coil 24 should happen, the coil 24 and the adjacent fixing member arranging portion 44 may overlap with each other in a plan view when the motor 1 is assembled. If this happens, it is impossible to insert the fixing member 61 into this fixing member arranging portion 44. Also, a collapse of any coil 24 may happen after each fixing member 61 is inserted into the corresponding fixing member arranging portion 44, and the conducting wire of the collapsed coil 24 may be brought into contact with the adjacent fixing member 61. In the case where the fixing member 61 is made of an electrically conductive material, the contact of the conducting wire of the collapsed coil 24 with the fixing member 61 may cause an applied electric field to exceed the dielectric strength of a coating of the conducting wire of the coil 24. Accordingly, the coil guide walls 2623 are provided to prevent a radially outward collapse of each coil 24.

Each passage line guide wall 2624 is preferably integrally joined to adjacent ones of the coil guide walls 2623. That is, each passage line guide wall 2624 and each adjacent coil guide wall 2623 are joined to each other through one of the joining walls 2625. An improvement in rigidity of the coil guide wall 2623 is achieved by joining the coil guide wall 2623 and the passage line guide wall 2624 to each other through the joining wall 2625. As a result, falling of the lower core back insulating projecting portion 2621 is prevented even if winding of the conducting wire causes tension to the lower core back insulating projecting portion 2621. Each coil guide wall 2623 is arranged radially inward of each passage line guide wall 2624. Each passage line guide wall 2624 preferably has a radial thickness smaller than that of each coil guide wall 2623.

Each passage line guide wall 2624 is preferably a wall-shaped portion arranged to guide a passage line(s) led from the coil(s) 24. The passage line guide wall 2624 is arranged to project in the axial direction away from the surface covering the core back 231. Each of the passage line holding portions 2626 is arranged radially inside a separate one of the passage line guide walls 2624. Each passage line holding portion 2626 is arranged to support the corresponding passage line(s) with a radially outer surface thereof. An inner surface of each passage line guide wall 2624 and a corresponding one of the passage line holding portions 2626 are arranged radially opposite each other. The passage line(s), each of which is a portion of the conducting wire, are arranged between the passage line guide wall 2624 and the corresponding passage line holding portion 2626 and are thereby guided. Each passage line holding portion 2626 includes a slanting surface at a top of the outer surface thereof. When the passage line(s), each of which is a portion of the conducting wire, are inserted between the passage line holding portion 2626 and the corresponding passage line guide wall 2624, the passage line(s) are guided by this slanting surface, and workability is improved. Moreover, in the present preferred embodiment, all the passage lines are arranged on a side of the armature 29 closer to the lower bracket 22. Therefore, no passage lines are arranged on a side of the armature 29 closer to the upper bracket 21, where the circuit board 27 is arranged. This eliminates a need to take the passage lines into consideration when arranging the wiring pattern on the circuit board 27, resulting in improved flexibility in circuit design.

The lower bracket 22 is preferably fixed to the stator core 23 as described above. Note that the lower bracket 22 may be fixed to the lower insulator 26. Fixing of the lower bracket 22 to the lower insulator 26 in the case where the lower bracket 22 is fixed to the lower insulator 26 will now be described below. An inner surface of the lower bracket 22 and an outer surface of the lower core back insulating projecting portion 2621 of the lower insulator 26 are preferably in contact with each other and are thus fixed to each other. A radially outer surface of each coil guide wall 2623 is preferably in contact with an inner surface of a corresponding one of the lower vertical ribs 226. A lower end surface of each coil guide wall 2623 is preferably in contact with an upper surface of a corresponding one of the lower horizontal ribs 225. The lower end surface of each passage line guide wall 2624 is preferably in contact with an upper surface of a corresponding one of the lower depressed portions 227. At least one circumferential side surface of each lower vertical rib 226 is arranged opposite to a corresponding one of the joining walls 2625. The lower projecting portion 223 is arranged radially outside the lower core back insulating projecting portion 2621. The upper end of the lower projecting portion 223 is preferably in contact with a lower end of the core back 231 of the stator core 23. The lower bracket 22 and the lower insulator 26 are positioned in the above-described manner.

Referring to FIG. 7, each fixing member 61 is preferably inserted into the corresponding fixing member arranging portion 44 to fix the upper bracket 21 and the armature 29 to the lower bracket 22. A radially inner end of each fixing member arranging portion 44 is arranged radially inward of the outer surface of each coil guide wall 2623. The radially inner end of each fixing member arranging portion 44 is arranged radially outward of the inner surface of each coil guide wall 2623. The lower core back insulating portion 262 preferably includes recessed portions 2627. Each recessed portion 2627 is arranged in the vicinity of a separate one of the fixing member arranging portions 44, and is recessed radially inward. In other words, each recessed portion 2627 is recessed radially inward so as to extend along an edge of the separate fixing member arranging portion 44. Since both the lower insulator 26 and the stator core 23 are mass-produced products, each of the lower insulator 26 and the stator core 23 is preferably molded with a certain dimensional tolerance. Thus, provision of the recessed portions 2627 contributes to preventing the lower core back insulating portion 262 and each fixing member arranging portion 44 from overlapping with each other in a plan view when the lower insulator 26 and the stator core 23 are fitted to each other. That is, the provision of the recessed portions 2627 contributes to preventing each fixing member 61 from contacting the lower insulator 26 when the fixing member 61 is inserted into the corresponding fixing member arranging portion 44. A radially inner end of each recessed portion 2627 is arranged radially outward of the inner surface of each coil guide wall 2623. This contributes to providing secure isolation between each coil 24 and the stator core 23 since the coils 24 are arranged radially inside the inner surfaces of the coil guide walls 2623.

Here, the radially inner end of each recessed portion 2627 is arranged radially inward of the outer surface of each coil guide wall 2623. Therefore, absence of the cut portions 2622 would produce problems described below. Suppose that each coil guide wall 2623 is arranged to extend along a corresponding one of the recessed portions 2627 without the cut portions 2622. In this case, the radially inner surface of the coil guide wall 2623 is arranged to project radially inward near the corresponding recessed portion 2627. This results in a reduction in a space in which the conducting wire is wound, resulting in a reduction in a space factor. This may lead to a reduction in efficiency of the motor 1. In addition, the likelihood that the conducting wire will contact an upper surface of the coil guide wall 2623 to cause a break in the conducting wire when the conducting wire is wound around the magnetic pole tooth 232 is increased. Next, suppose that the radially outer surface of each coil guide wall 2623 is depressed along a corresponding one of the recessed portions 2627 while the radially inner surface of the coil guide wall 2623 does not project radially inward near the recessed portion 2627. In this case, a portion of the coil guide wall 2623 which radially overlaps with the recessed portion 2627 preferably has a decreased radial thickness. When the coil 24 is preferably in contact with the radially inner surface of the coil guide wall 2623, a strong radially outward force is applied to the coil guide wall 2623 at a circumferential middle of the coil 24. That is, the portion of the coil guide wall 2623 which radially overlaps with the recessed portion 2623 tends to be easily bent radially outward. If this happens, the coil guide wall 2623 and the adjacent fixing member arranging portion 44 will overlap with each other in the plan view, preventing insertion of the fixing member 61 into the fixing member arranging portion 44. In the case where the lower insulator 26 is produced by an injection molding process, it may be difficult to mold the portion of each coil guide wall 2623 which has the decreased radial thickness with stably high precision since a cavity of a mold may not be fully filled with the resin.

Also, an edge of each recessed portion 2627 and an inner end edge of the lower core back insulating projecting portion 2621 may be arranged to partially coincide with each other in the plan view. That is, a portion of each recessed portion 2627 of the lower insulator 26, having a circumferential extent, may be omitted. At least one of circumferential side surfaces of the lower core back insulating projecting portion 2621 which define each cut portion 2622 may be arranged to coincide with a portion of a corresponding one of the recessed portions 2627 in the plan view. That is, at least one circumferential end portion of each recessed portion 2627 may be arranged to coincide with a side end portion of a corresponding one of the cut portions 2622. The above arrangements contribute to more effectively preventing a collapse of each coil 24.

Next, a preferred embodiment of a process of fitting the armature 29, the circuit board 27, and the upper and lower brackets 21 and 22 to one another will now be described below. Note that the assembly including the stator core 23, the coils 24, the upper insulator 25, and the lower insulator 26 is defined as the armature 29.

First, the end portions of the conducting wires extending from the coils 24 and used for the U phase, the V phase, the W phase, and the common, respectively, are drawn out radially outward through the window portions 2541 and 2552 of the upper insulator 25. This prevents each conducting wire from being held between the upper insulator 25 and the circuit board 27 if the circuit board 27 is placed on the armature 29.

Next, the circuit board 27 is placed on the seating surface 2531 of the upper insulator 25 of the armature 29. At this time, each protruding positioning portion 254 is inserted into a corresponding one of the positioning portions 272 of the circuit board 27. This preferably improves a precision with which the circuit board 27 is positioned with respect to the armature 29. This in turn preferably improves a precision in positioning the magnetic sensor 271 mounted on the circuit board 27. In addition, each hook portion 255 is inserted through a corresponding one of the hook insertion portions 274 of the circuit board 27. The hook portion 255 undergoes elastic deformation, so that the hook-shaped portion 2551 of the hook portion 255 is preferably in contact with the upper surface of the circuit board 27 or is arranged axially opposite the upper surface of the circuit board 27 with a gap intervening therebetween. This prevents the circuit board 27 from moving in the axial direction relative to the armature 29, accomplishing temporary fixing of the circuit board 27.

At this time, the circumferential positions of the window portions 2541 and 2552 and those of the positioning portions 272 and the hook insertion portions 274, respectively, are arranged to coincide with each other. Preferably, the circumferential positions of the window portions 2541 and 2552 and those of the increased width positioning portions 2722 and the increased width hook insertion portions 2742, respectively, are arranged to coincide with each other. This improves workability in the soldering process described below.

Next, each of the drawn-out end portions of the conducting wires is soldered to a corresponding one of the lands on the upper surface of the circuit board 27. At this time, some of the lands are preferably arranged adjacent to the hook insertion portions 274 or the fixing member insertion portions 275 to facilitate the soldering process.

Next, the upper bracket 21 is placed on the circuit board 27 such that the inner circumferential surface of the upper projecting portion 213 of the upper bracket 21 is in contact with the stator core 23. This allows circumferential and radial positioning of the upper bracket 21 and the armature 29 with respect to each other to be accomplished with high precision. This contributes to improving precision with which the upper bearing 281 supported by the upper bracket 21 is coaxial with the armature 29. At this time, the through holes 214, the fixing member insertion portions 275, and the fixing member insertion recessed portions 256 are arranged at the same positions in a plan view. This facilitates insertion of the screws 61.

The lower bracket 22 is placed on a lower side of the armature 29. At this time, the outer surface of each coil guide wall 2623 is preferably in contact with the inner surface of a corresponding one of the lower vertical ribs 226. In addition, the lower end surface of each passage line guide wall 2624 is preferably in contact with the lower surface of a corresponding one of the lower depressed portions 227. The above arrangements allow circumferential positioning of the lower bracket 22 to be easily accomplished.

Finally, the upper bracket 25, the circuit board 27, the armature 29, and the lower bracket 26 are fixed through the screws 61. Specifically, each screw 61 is preferably inserted through a corresponding one of the through holes 214 of the upper bracket 21, a corresponding one of the fixing member insertion recessed portions 256 of the upper insulator 25, a corresponding one of the through holes 233 of the stator core 23, and a corresponding one of the recessed portions 2627 of the lower insulator 26, and is fixed to a corresponding one of the lower fixing member accommodating portions 224 of the lower bracket 22.

As a result, an upper end surface of the stator core 23 is brought into contact with a lower end surface of the upper projecting portion 213 of the upper bracket 21. In addition, a lower end surface of the stator core 23 is brought into contact with an upper end surface of the lower bracket 22. In addition, the circuit board 27 is held between the upper bracket 21 and the core back insulating portion 252. As a result, both the circuit board 27 and the upper bracket 21 are securely fixed to the armature 29.

An upper end of the upper bearing 281 is arranged at an axial level higher than that of a lower end of a head portion of each screw 61. A great distance between the upper and lower bearings 281 and 282 is thus secured, and the shaft 31 is stably supported by the upper and lower bearings 281 and 282.

While preferred embodiments of the present invention have been described above, it will be understood that the present invention is not limited to the above-described preferred embodiments. Motors according to other preferred embodiments of the present invention may include no fixing members 61 as described below. In such preferred embodiments of the present invention, each of the upper and lower brackets is preferably fixed to the armature through press fit, adhesion, crimping, welding, or the like, for example. Even in such preferred embodiments of the present invention, the same armature 29 according to a preferred embodiment of the present invention, in which the motor includes the fixing members 61, may be used. Even in such a case, collapsing of each coil is prevented even if the cut portions are defined in the lower insulator as in the above-described preferred embodiment.

Figure 9:
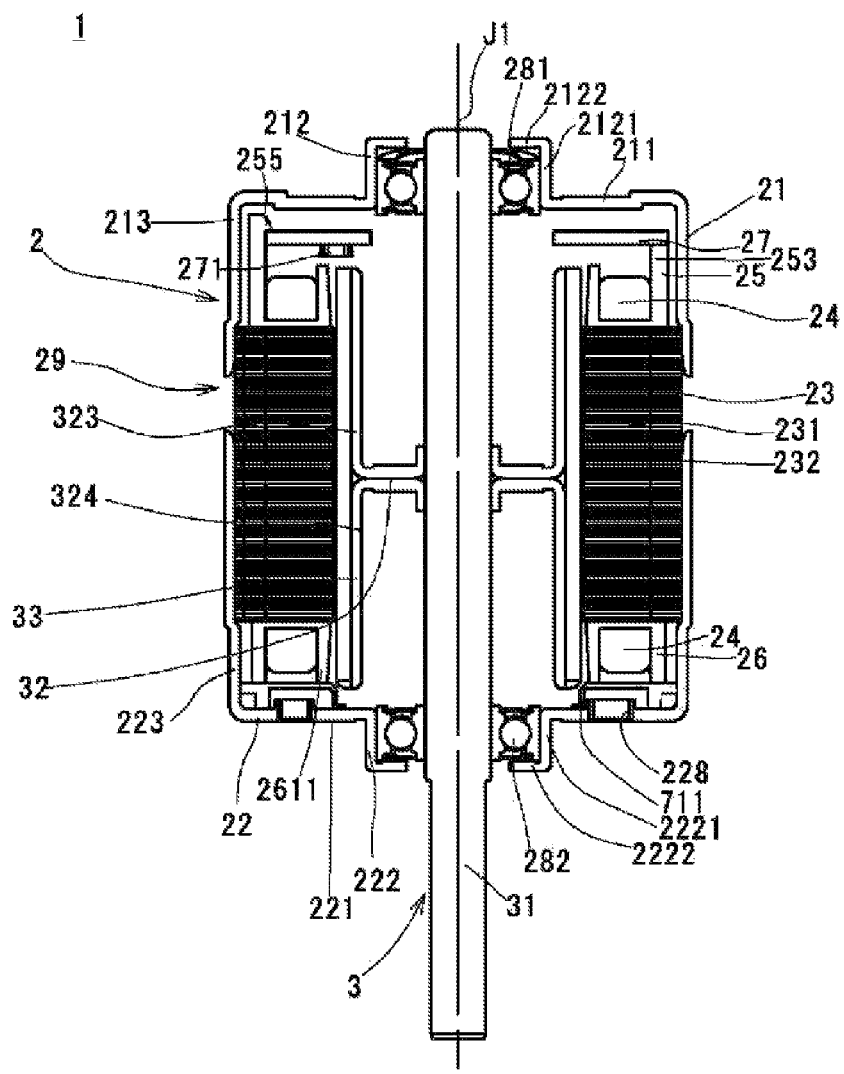
FIG. 9 is a cross-sectional view of a motor according to another preferred embodiment of the present invention.

FIG. 9 is a diagram illustrating another preferred embodiment of the present invention. Descriptions below center on differences from the above-described preferred embodiment of the present invention. Referring to FIG. 9, each of an upper bracket and a lower bracket according to the present preferred embodiment is preferably obtained by, for example, so-called press working, that is, by stamping a steel sheet to shape it. A rotor holder according to the present preferred embodiment is preferably defined by a combination of an upper rotor holder member and a lower rotor holder member, each of which has a bottom and is cylindrical in shape, arranged back to back. That is, a bottom surface of the upper rotor holder member and a bottom surface of the lower rotor holder member are arranged opposite to each other with a minute gap intervening therebetween. Each of the upper and lower rotor holder members is preferably obtained by, for example, press working, that is, by stamping a steel sheet to shape it.

In the present preferred embodiment, a stator core is preferably press fitted to an upper projecting portion, and is thus fixed to the upper bracket. Note that the stator core may be fixed to the upper bracket not through press fit but through a combination of insertion and adhesion or through welding. In the case where the stator core is fixed to the upper bracket through the combination of insertion and adhesion or through welding, an inner circumferential surface of the upper projecting portion may be arranged to be in contact with an outer circumferential surface of a circuit board or an outer circumferential surface of an upper insulator. An improvement in strength of the upper bracket is achieved when the inner circumferential surface of the upper projecting portion is arranged to be in contact with the circuit board or the upper insulator. Meanwhile, the stator core is preferably press fitted to a lower projecting portion, and is thus fixed to the lower bracket. Note that the stator core may be fixed to the lower bracket not through press fitting but through, for example, a combination of insertion and adhesion or through welding.

Figure 10:
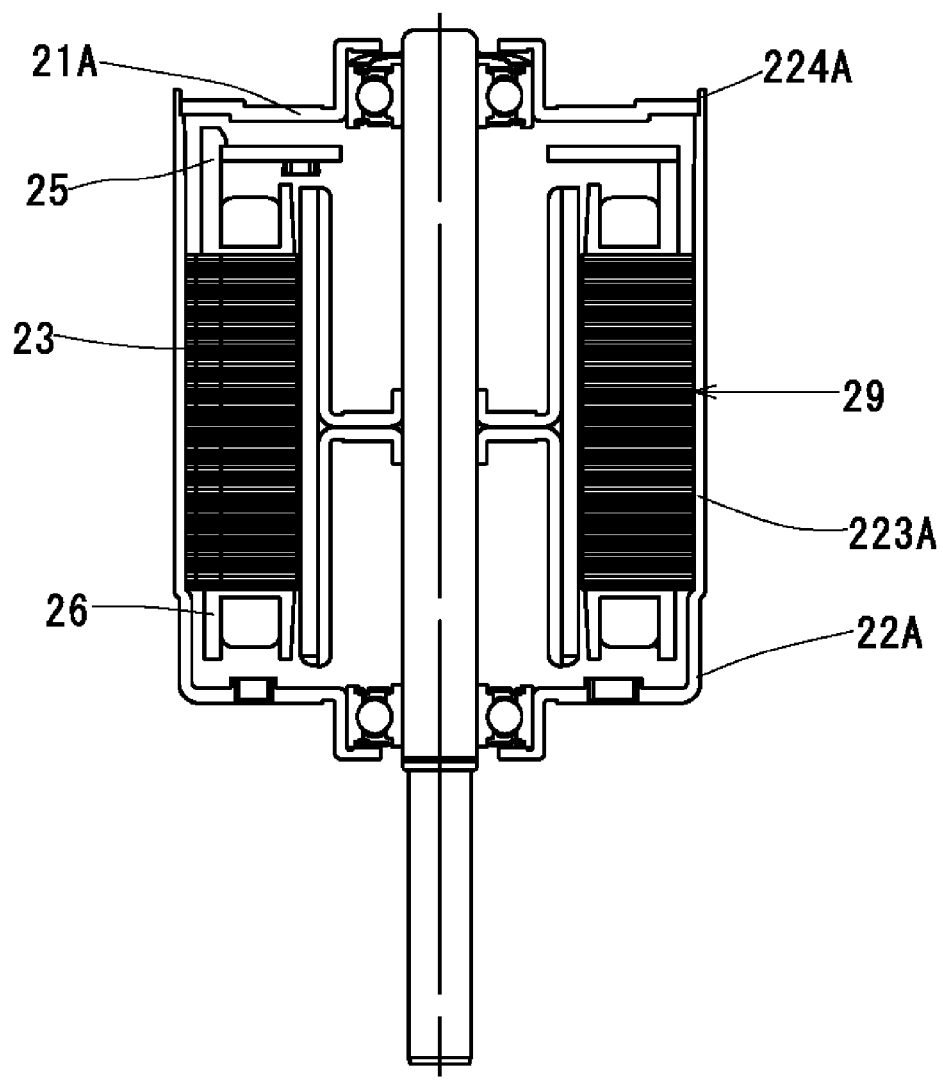
FIG. 10 is a cross-sectional view of a motor according to yet another preferred embodiment of the present invention.

FIG. 10 is a diagram illustrating another preferred embodiment of the present invention. Referring to FIG. 10, a lower bracket 22A is preferably arranged to cover an outer circumferential surface of an armature 29. More specifically, the lower bracket 22A according to the present preferred embodiment preferably has an axial dimension greater than that of a stator core 23. Further, the axial dimension of the lower bracket 22A preferably is greater than the combined axial dimension of an upper insulator 25 and a lower insulator 26. More specifically, the axial dimension of a lower projecting portion 223A of the lower bracket 22A preferably is greater than the combined axial dimension of the upper insulator 25 and the lower insulator 26. A crimping portion 224A to which an upper bracket 21A described below is fixed is arranged at a top of the lower projecting portion 223A of the lower bracket 22A. The upper bracket 21A is preferably in or substantially in the shape of a disk, and includes no upper projecting portion. The upper bracket 21A is fixed to the lower bracket 22A as a result of plastic deformation of the crimping portion 224A. A casing may be defined in the above-described manner.

The casing arranged to cover an entire outer side of the armature 29 as described above contributes to reducing vibrations and noise which are generated in the motor, and also to preventing dust from intruding into an interior of the motor.

Figure 11:
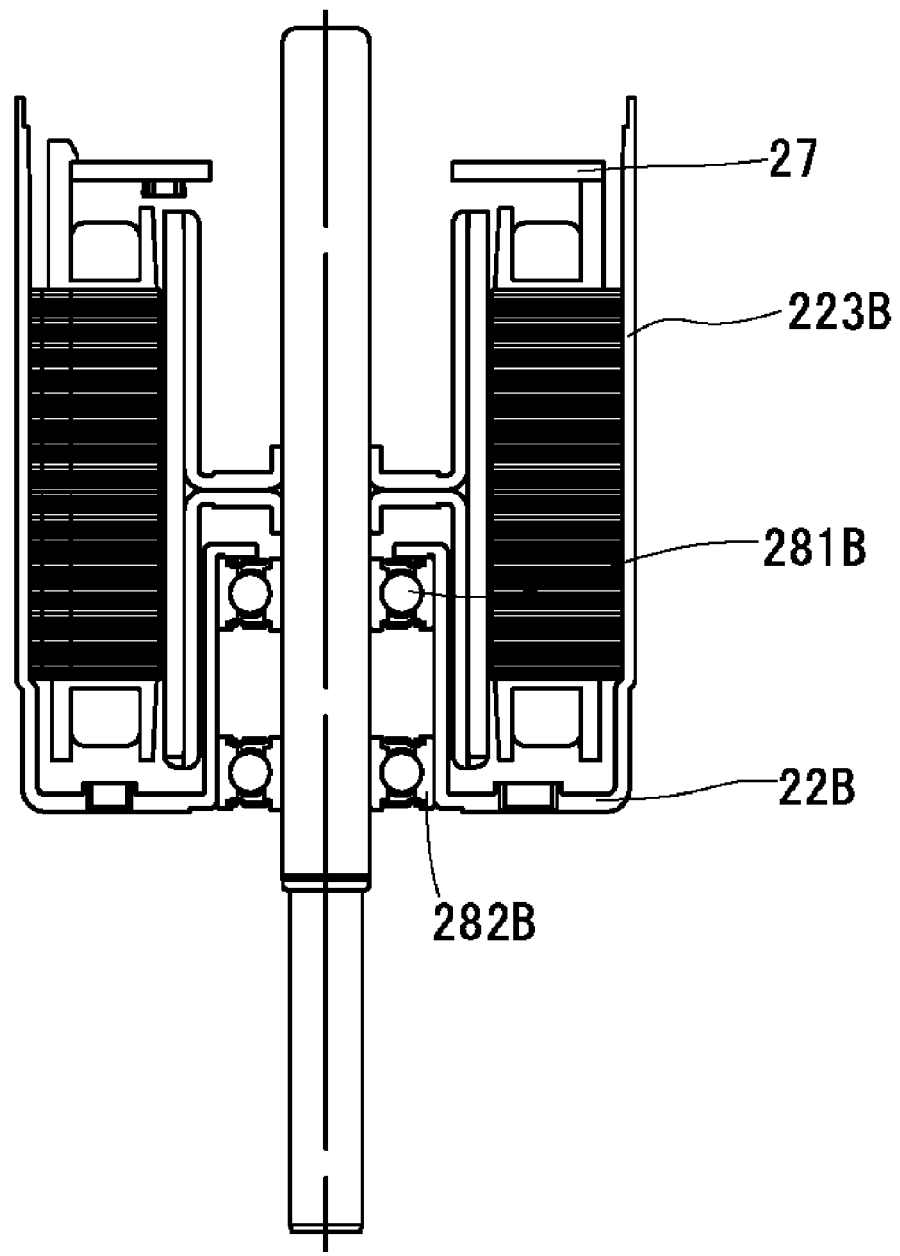
FIG. 11 is a cross-sectional view of a motor according to a further preferred embodiment of the present invention.

FIG. 11 is a diagram illustrating yet another preferred embodiment of the present invention. Referring to FIG. 11, a lower holding portion 223B of a lower bracket 22B is preferably arranged to extend axially upward to a great extent. Moreover, the lower holding portion 222B is arranged to hold not only a lower bearing 282B but also an upper bearing 281B. Furthermore, in the present preferred embodiment, no upper bracket is provided, so that a circuit board 27 is exposed. Note that a member arranged to cover the circuit board 27 may be provided in place of the upper bracket.

Figure 12:
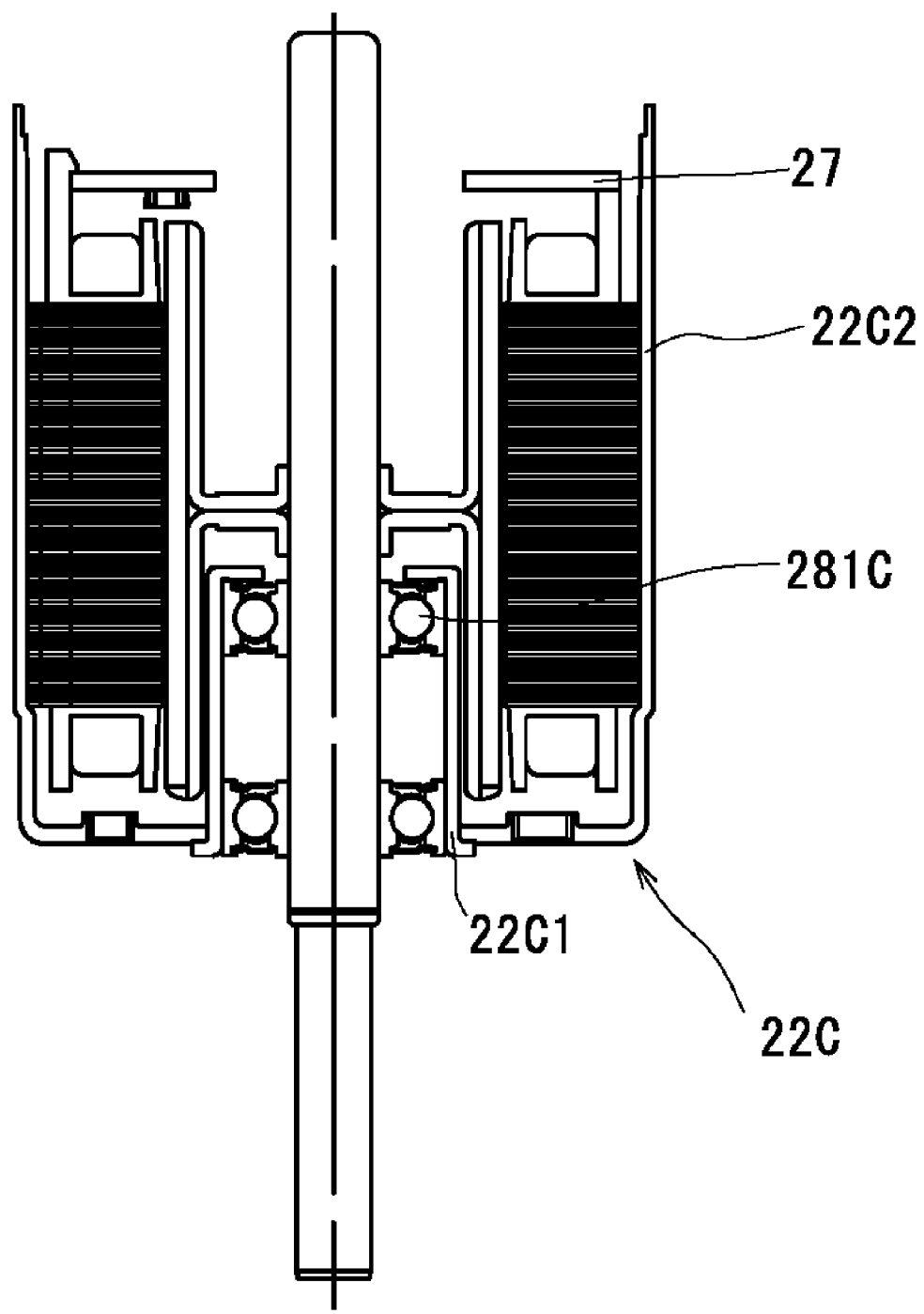
FIG. 12 is a cross-sectional view of a motor according to one more preferred embodiment of the present invention.

FIG. 12 is a diagram illustrating yet another preferred embodiment of the present invention. Referring to FIG. 12, a lower bracket 22C according to this preferred embodiment is preferably defined by two members: an inner lower bracket 22C1 and an outer lower bracket 22C2. The outer lower bracket 22C2 is in contact with the bearings 281C which are arranged to rotatably support a shaft.

While the motor according to the above-described preferred embodiments of the present invention preferably is a three-phase brushless motor, this is not essential to the present invention. Motors according to other preferred embodiments of the present invention may be single-phase or two-phase brushless motors, brushed motors including brushes and commutators, or any other type of motor, such as, for example, stepping motors.

Note that, although each of the upper and lower projecting portions according to the above-described preferred embodiment preferably is annular or substantially annular, for example, this is not essential to the present invention. Each of the upper and lower projecting portions may be in another shape. For example, each of the upper and lower projecting portions may be defined by a plurality of plate-shaped portions.

Also note that, although the upper bracket 21 according to the above-described preferred embodiment is preferably configured so that the upper bearing is arranged in the central opening portion, this is not essential to the present invention.

Also note that an object to be rotated may be fixed to either an upper portion or a lower portion of the shaft 31, and that objects to be rotated may be fixed to both the upper and lower portions of the shaft 31. Also note that the upper insulator 25 and the lower insulator 26 may be reversed.

Also note that features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a bearing portion including an upper bearing and a lower bearing;
   a shaft, including a central axis extending in a vertical direction as a center thereof, rotatably supported by the bearing portion;
   a rotor magnet that rotates together with the shaft;
   an armature radially outside the rotor magnet;
   an upper bracket axially above the armature, and that holds the upper bearing at a radial center thereof, the upper bearing being configured to rotatably support the shaft;
   a lower bracket axially below the armature, and that holds the lower bearing at a radial center thereof, the lower bearing being configured to rotatably support the shaft; and
   a fixing member that extends in the vertical direction, and fixes the armature to each of the upper and lower brackets; wherein
   the armature includes:
      a stator core including a core back and a plurality of magnetic pole teeth configured to project radially inward from the core back;
      an insulator that covers at least an upper surface and a lower surface of each of the plurality of magnetic pole teeth of the stator core; and
      coils each of which is defined by a conducting wire wound around a separate one of the plurality of magnetic pole teeth with the insulator intervening therebetween;
   the insulator includes:
      magnetic pole tooth insulating portions each of which covers a separate one of the plurality of magnetic pole teeth; and
      a core back insulating portion integrally provided with each of the magnetic pole tooth insulating portions as a single monolithic member, and covering at least portions of upper and lower end surfaces of the core back;
   the stator core further includes a fixing member arranging portion that has the fixing member inserted therethrough in an axial direction, located radially outside one of the plurality of magnetic pole teeth, and defined by a through hole or a cut recessed radially inward from a radially outer circumference of the stator core;
   the core back insulating portion includes:
      coil guide walls, each of which is located radially outside a corresponding one of the plurality of magnetic pole tooth insulating portions;
      a fixing member insertion recessed portion or through hole which is positioned directly adjacent to the fixing member; and
      a cut portion at a position radially opposed to the fixing member and radially inward from the fixing member insertion recessed portion or through hole;
   a radially inner surface of each of the coil guide walls is in contact with a corresponding one of the coils;
   the fixing member insertion recessed portion or through hole and the cut portion are provided in a flange of the core back insulating portion which is in direct contact with one of the upper and lower end surfaces of the core back; and
   the cut portion is defined by a radially extending channel passing completely through one of the coil guide walls such that no portion of the one of the coil guide walls is between the fixing member and a corresponding one of the coils.

2. The motor according to claim 1, wherein
   the lower bracket is in a shape of a covered cylinder;
   the core back insulating portion includes a core back projecting portion which is provided with passage line guide walls, each of which is integrally joined to adjacent ones of the coil guide walls, configured to guide a passage line; and
   both an outer surface of each coil guide wall and an outer surface of each passage line guide wall are opposed to an inner surface of the lower bracket.

3. The motor according to claim 2, wherein
   the core back insulating projecting portion further includes joining walls, each of which joins an adjacent one of the coil guide walls and an adjacent one of the passage line guide walls to each other; and
   each coil guide wall is located radially inward of each passage line guide wall.

4. The motor according to claim 2, wherein
   the core back insulating projecting portion further includes passage line holding portions;
   an inner surface of each passage line guide wall and a corresponding one of the passage line holding portions are radially opposite to each other; and
   the conducting wire is located between the passage line guide wall and the corresponding passage line holding portion.

5. The motor according to claim 2, wherein
   the lower bracket includes ribs each of which extends in the axial direction in an inner surface thereof; and
   an inner surface of each rib is radially opposite to the outer surface of a corresponding one or ones of the coil guide walls.

6. The motor according to claim 2, wherein
   the lower bracket includes ribs each of which extends in the axial direction in an inner surface thereof; and
   at least one circumferential side surface of each rib is located opposite to a corresponding one of the joining walls.

7. The motor according to claim 2, wherein each passage line guide wall has a radial thickness smaller than that of each coil guide wall.

8. The motor according to claim 2, wherein the radially inner end of the fixing member arranging portion is located radially inward of the outer surface of each coil guide wall.

9. The motor according to claim 1, wherein the cut portion has a circumferential width smaller than that of each magnetic pole tooth around which the conducting wire is wound.

10. The motor according to claim 1, wherein a radially inner end of the fixing member insertion recessed portion or through hole is located radially outward of an inner surface of each coil guide wall.

11. The motor according to claim 10, wherein an edge of the fixing member insertion recessed portion or through hole and an inner end edge of a core back insulating projecting portion of the core back insulating portion partially coincide with each other in a plan view.

12. The motor according to claim 1, wherein
the core back insulating portion includes a core back insulating projecting portion which includes circumferential side surfaces defining the cut portion; and
at least one of the circumferential side surfaces coincides with a portion of the fixing member insertion recessed portion or through hole in a plan view.

13. The motor according to claim 1, wherein the cut portion is cut up to a root of a core back insulating projecting portion of the core back insulating portion.

14. The motor according to claim 1, wherein
the lower bracket includes an annular or substantially annular lower projecting portion; and
the core back includes a core back exposed portion where the core back and an upper surface of the lower projecting portion are in direct contact with each other, the core back exposed portion being located radially outward of the core back insulating portion.

15. The motor according to claim 1, wherein a radially outer surface of a core back insulating projecting portion of the core back insulating portion is located radially outward of the radially inner end of the fixing member arranging portion.

16. The motor according to claim 1, wherein the radially inner end of the fixing member insertion recessed portion or through hole is radially inward of the outer surface of each of the coil guide walls.

* * * * *